United States Patent [19]
Suzuki et al.

[11] Patent Number: 5,588,302
[45] Date of Patent: Dec. 31, 1996

[54] CAR AIR CONDITIONER

[75] Inventors: Yoshitaka Suzuki; Masako Kondo, both of Wakoh; Takashi Endo; Toshihiro Zama, both of Yamato; Yuji Shimoda; Hiroshi Takata, both of Yokohama, all of Japan

[73] Assignees: Honda Giken Kogyo Kabushiki Kaisha; Stanley Electric Co., Ltd.

[21] Appl. No.: 445,923

[22] Filed: May 22, 1995

[30] Foreign Application Priority Data

May 23, 1994 [JP] Japan ..................... 6-130851

[51] Int. Cl.⁶ .................................... B60H 1/00
[52] U.S. Cl. .................................. 62/161; 62/180
[58] Field of Search ............... 62/180, 186, 151, 62/150, 161, 162, 163, 164, 244, 323.4, 228.1; 165/17, 16

[56] References Cited

U.S. PATENT DOCUMENTS

| | | | |
|---|---|---|---|
| 4,448,034 | 5/1984 | Shimada et al. | 62/161 |
| 4,730,662 | 3/1988 | Kobayashi | 62/180 X |
| 4,910,967 | 3/1990 | Takahashi | 165/17 X |
| 5,065,589 | 11/1991 | Taguchi | 62/161 |

*Primary Examiner*—Harry B. Tanner
*Attorney, Agent, or Firm*—Weingarten, Schurgin, Gagnebin & Hayes LLP

[57] ABSTRACT

A car air conditioner is free from the problem of insufficient and frustrating defrosting effect of a conventional air conditioner that becomes apparent when wet air is blown onto the misted front window pane of the car in a rainy season by selecting a defroster position on the outlet vent selection switch of the air conditioner. In the control circuit of the air conditioner, the defroster contact 2a of the outlet vent selection switch 2 is connected to a pulse shaping circuit 9 for generating a pulse whenever selected and the pulse shaping circuit 9 is by turn connected to the reset terminal PR of a D flip-flop circuit 8, while the inverted output terminal Q2 of the D flip-flop circuit 8 is connected to an AC relay 5 by way of a NOR-gate 10 that calculates the logical sum of the logical value "L" generated when the compressor contact 3a of flow rate control switch 3 is closed. Thus, when the flow rate control switch 3 is closed and the defroster contact 2a of the outlet vent selection switch 2 is selected, the circuit automatically drive the compressor to solve the problem.

1 Claim, 3 Drawing Sheets

5,588,302

1
CAR AIR CONDITIONER

BACKGROUND OF THE INVENTION

1. Field of the Invention

This invention relates to a car air conditioner and, more particularly, it relates to a control circuit for controlling the operation of such an air conditioner.

2. Background Art

A conventional car air conditioner typically has a control arrangement with a configuration as illustrated in FIG. 3 of the accompanying drawings. Referring to FIG. 3, the arrangement for controlling the air conditioner 90 comprises an outlet vent selection switch 91, an air flow rate control switch 92 and an air compressor (AC) switch 93. The outlet vent selection switch 91 has a number of selectable positions including the one for the vent on the dash board and the one for the vent on the foot rest as well as the one for a defroster vent for blowing air onto the front window pane, which is shown as a defroster contact 91a in FIG. 3.

The air flow rate control switch 92 is designed to regulate the number of revolution per unit time of blower motor 94 and hence the flow rate of the air blown out of the outlet vent selected by the outlet vent selection switch 91 and comprises OFF contact 92a, LO contact 92 b, MID contact 92c and MAX contact 92d. The AC switch 93 is used to turn on and off an air compressor (not shown) by way of an air compressor relay 95 and comprises ON contact 93a and OFF contact 93b.

The air flow rate control switch 92 also comprises compressor contact 92e which is disconnected when the switch is turned off. On the other hand, the ON contact 93a of the AC switch 93 is grounded by way of said compressor contact 92e so that the compressor is not operated if the AC switch 93 is turned on unless said blower motor 94 is activated.

SUMMARY OF THE INVENTION

However, with a conventional car air conditioner having a configuration as described above, if the defroster contact 91a is selected by said outlet vent selection switch 91 to blow air to the front window pane at a rate controlled by the air flow rate control switch 92 in very wet weather as often observed in a rainy season, the frost on the window pane would not be removed to the driver's satisfaction because the air blown on to the window pane itself is highly wet.

According to the invention, the above problem is solved by providing a car air conditioner comprising a D flip-flop circuit having a reset terminal, a clock terminal and an inverted output terminal, an outlet vent selection switch having a defroster contact, a flow rate control switch having a compressor contact for generating an L-logical value when closed and a push-on type AC switch, characterized in that said AC switch is urged by the L-logical value generated when said compressor contact of said flow rate control switch is closed and at the same time connected to the clock terminal of said D flip-flop circuit by way of a rise shaping circuit, that the defroster contact of said outlet vent selection switch is connected to said reset terminal of said D flip-flop circuit by way of a pulse shaping circuit for generating a pulse when said defroster contact is selected and that the inverted output terminal of said D flip-flop circuit is connected to an AC relay by way of a NOR-gate for calculating the logical sum of the L-logical values generated when said compressor contact is closed.

2
BRIEF DESCRIPTION OF THE DRAWINGS

DETAILED DESCRIPTION OF THE PREFERRED EMBODIMENTS

Figure 1:
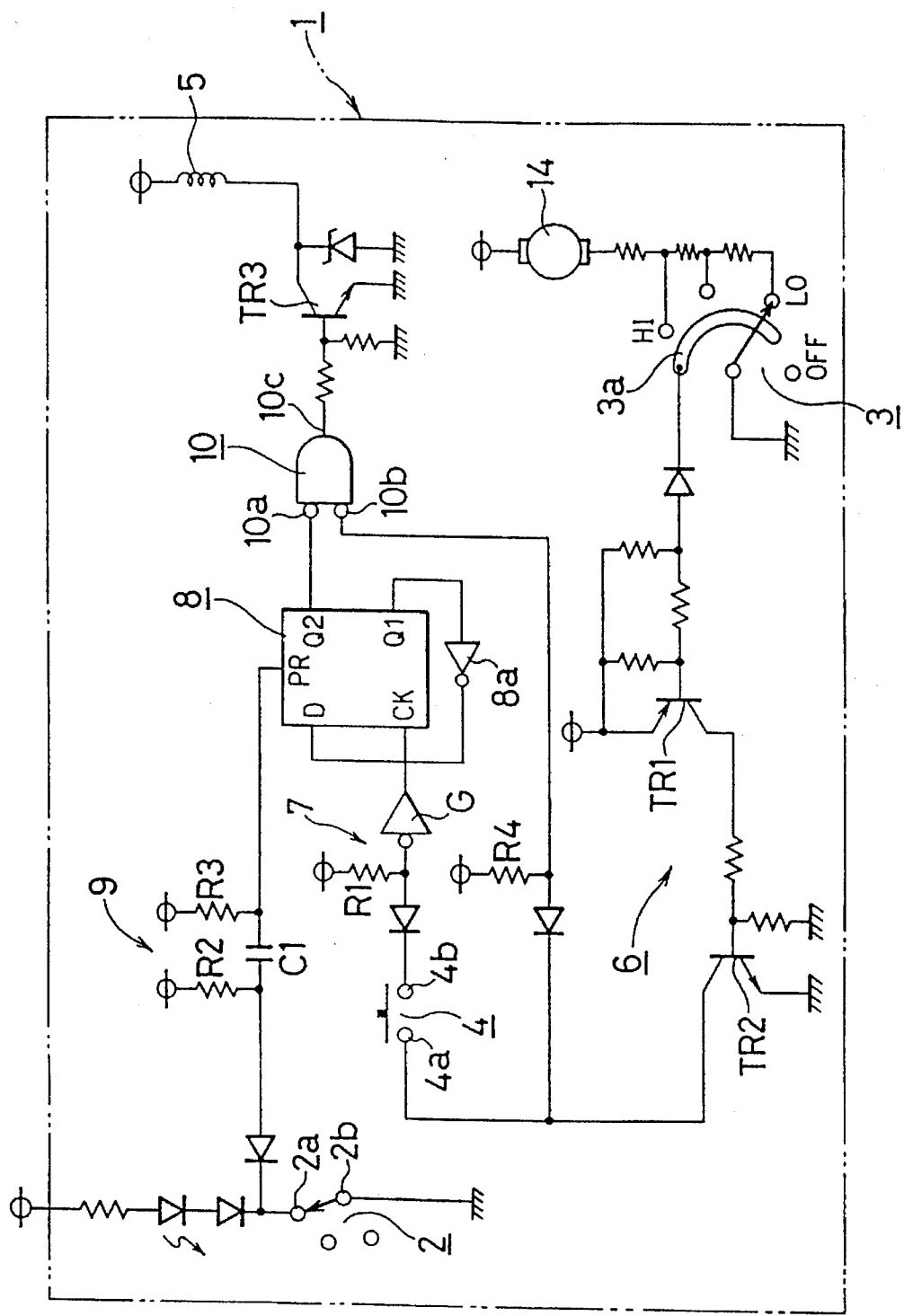
FIG. 1 is a circuit diagram of the control circuit of an embodiment of car air conditioner according to the invention.

Now, the present invention will be described in greater detail by referring to the accompanying drawings that illustrate preferred embodiments of the invention. Referring firstly to FIG. 1, showing a first embodiment of the invention, car air conditioner 1 is provided with a control circuit that comprises, as in the case of its counterpart of conventional car air conditioners, an outlet vent selection switch 2 having a defroster contact 2a, a flow rate control switch 3 having a compressor contact 3a for controlling the number of revolution per unit time of the fan motor 14 of the compressor and an AC switch 4.

Contrary to the control circuit of conventional car air conditioners, however, the compressor contact 3a is not connected to an AC relay 5 but to an L-logical value generating circuit 6 comprising a PNP transistor TR1 which is energized when the compressor contact 3a is grounded and an NPN transistor TR2 which is energized once the PNP transistor TR1 is energized such that logical value "L" is generated as the compressor contact 3a is closed.

Said AC switch 4 is of a push-on type that is energized as long as it is depressed and has an end 4a connected to the output of said L-logical value generating circuit 6. Thus, when the compressor contact 3a of the flow rate control switch 3 is closed and the L-logical value generating circuit 6 generates logical value "L", said end 4a is also grounded so that the AC switch is urged to operate.

The other end 4b of the AC switch is connected to a rise shaping circuit 7 typically comprising a pull-up resistor R1 and an inverter gate G and further to a clock terminal CK of a D (delayed) flip-flop circuit 8 via said rise shaping circuit 7.

The defroster contact 2a of said outlet vent selection switch 2 is used, as in the case of conventional car air conditioners, to select an outlet vent for blowing air to the front window pane. This defroster contact 2a is connected to a pulse shaping circuit 9 typically comprising a differential circuit constituted by pull-up resistors R2 and R3 and a capacitor C1 and the output of this pulse shaping circuit 9 is connected to a reset terminal PR of said D flip-flop circuit 8.

Since the reset terminal PR of the D flip-flop circuit 8 is designed to apply a pulse in a negative direction or operate for a negative logic, said pulse shaping circuit 9 is also designed to generate a pulse wave in a negative direction. Note that the central contact 2b of the outlet vent selection switch 2 of this embodiment is connected to ground to enable activation of a light-emitting diode independent of the state of the flow rate control switch 3.

An inverted output terminal Q2 of said D flip-flop circuit 8 is connected to one of an input terminals 10a of a NOR-gate 10 while another input terminals 10b of the NOR-gate 10 is connected to the output of said D flip-flop circuit 6 to which a pull-up resistor R4 is annexed. An output terminal 10c of the NOR-gate 10 is connected to an AC relay 5 via an NPN transistor TR3.

The control circuit of a car air conditioner having the above described configuration operates in a manner as described below. Assume now that the front window pane is misted and the car driver manipulates the flow rate control switch 3 and then the outlet vent selection switch 2 (or vice versa) to remove the mist on the window pane.

As the car driver operates the flow rate control switch 3, the L-logical value generating circuit 6 is activated to generates logical value "L" on its output terminal. Then, as the car driver operates the outlet vent selection switch 2 and selects and closes the defroster contact 2a, said pulse shaping circuit 9 is activated to generate a pulse wave on its output terminal and applies the pulse wave to the reset terminal PR of said D flip-flop circuit.

Thus, the D flip-flop circuit 8 is initialized by the pulse wave applied to its reset terminal PR and, therefore, the logical value "L" is sent out to the inverted output terminal Q2 and applied to the input terminal 10a of the NOR-gate 10. Since the logical value "L" generated by said L-logical value generating circuit 6 is also applied to the input terminal 10b of said NOR-gate 10 under this condition, logical value "H" is produced to the output terminal 10c of the NOR-gate 10.

Consequently, the NPN transistor TR3 is energized by the logical value "L" from the NOR-gate 10 to urge the AC relay 5 and activate the compressor. In other words, by operating the outlet vent selection switch 2 and the flow rate control switch 3 of the car air conditioner of the present invention, the compressor is activated without operating the AC switch 4 so that the mist on the window pane that would not be removed by blowing wet air in a rainy season can be automatically wiped out.

When the mist on the window pane is wiped out and the car driver determines that the compressor does not need to be driven any more, he or she operates the AC switch 4 so that the output of the output terminal Q1 of the D flip-flop circuit 8 is fed back to delay terminal D of the device by way of inverter 8a. Since logical value "L" being applied to the delay terminal D, it is forwarded to the output terminal Q1 and, at the same time, logical value "H" is produced to the inverted output Q2 to make the output of the NOR-gate 10 equal to logical value "L" and stop the operation of the compressor.

If the driver determines that the compressor needs to be driven anew and operates the AC switch 4 for another time, logical value "L" is produced on the inverted output terminal Q2 of the D flip-flop circuit 8 once again to drive the compressor. Thus, the compressor can be driven and stopped at the driver's will by operating the AC switch 4.

Figure 2:
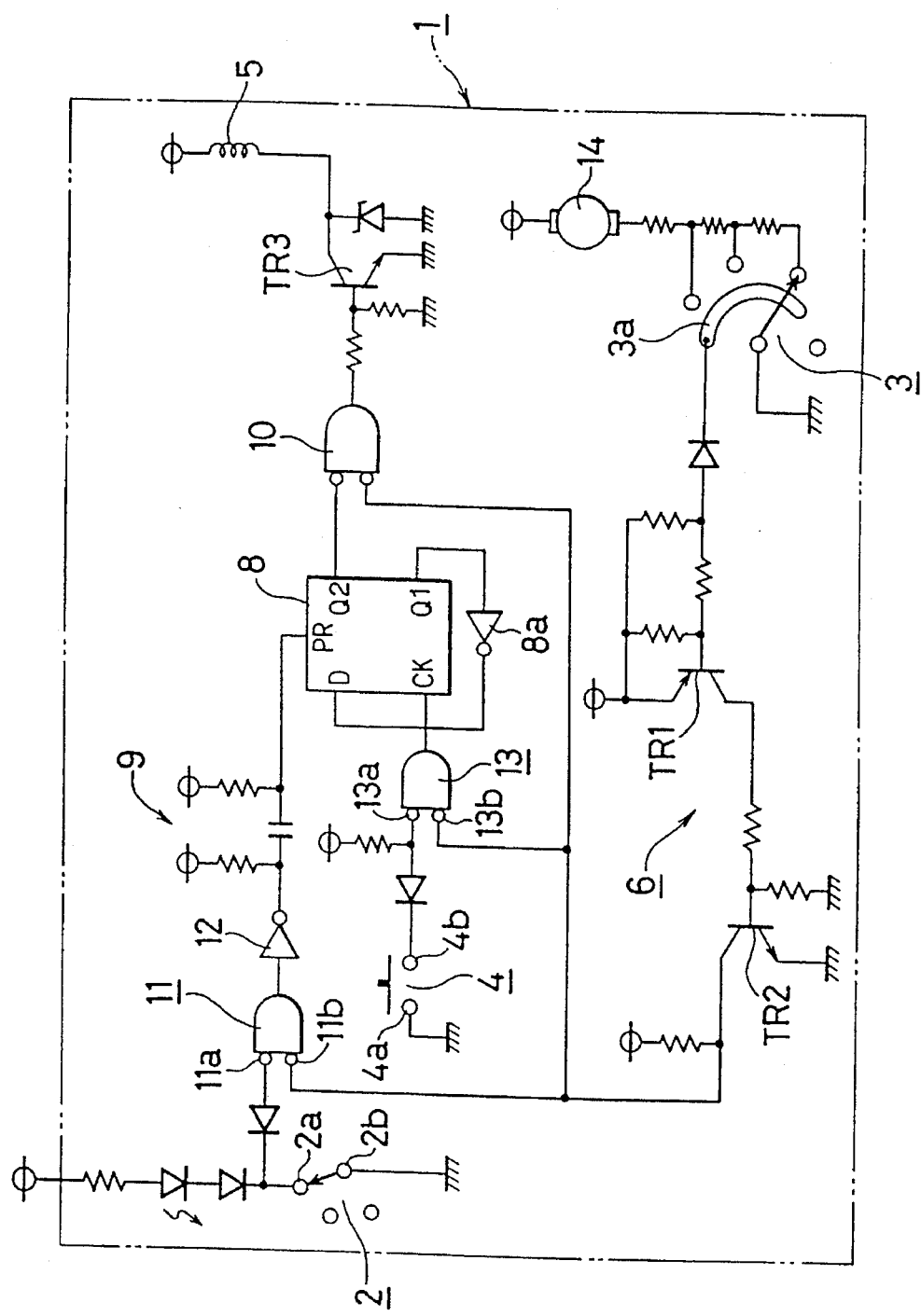
FIG. 2 is a circuit diagram of the control circuit of another embodiment of car air conditioner according to the invention.
Figure 3:
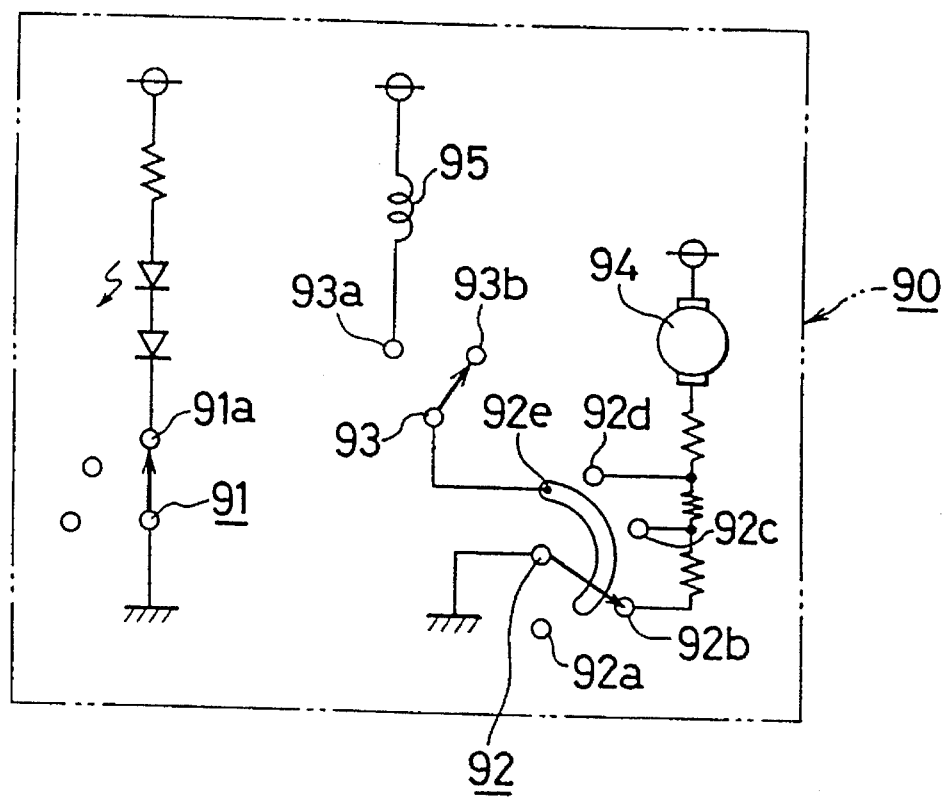
FIG. 3 is a simplified circuit diagram of the control circuit of a conventional car air conditioner.

FIG. 2 illustrates a second embodiment of the invention. While the outlet vent selection switch 2 and the AC switch 4 are connected to the L-logical value generating circuit 6 so that the AC switch 4 is urged to operate in response to the operation of the L-logical value generating circuit 6 which is triggered when the flow rate control switch 3 is manipulated. It should be noted, however, many commercially available switches of these types have central contacts (corresponding to the central contacts 2b and 4a of the switches 2 and 4) that are directly grounded.

The second embodiment utilizes such switches. More specifically, the outlet vent selection switch 2 of this embodiment has a defroster contact 2a connected to one of the input terminals 11a of a NOR-gate 11 and the other input terminal 11b of the NOR-gate 11 is connected to the output of an L-logical value generating circuit 6, while the output terminal of the NOR-gate 11 is connected to a pulse shaping circuit 9 via an inverter 12.

Likewise, the other terminal 4b of the AC switch 4 is connected to one of the input terminals 13a of a NOR-gate 13 and the other input terminals 13b of the NOR-gate 13 is connected to the output terminal of the L-logical value generating circuit 6, while the output terminal of the NOR-gate 13 is connected to the clock terminal CK of a D flip-flop circuit 8. Otherwise, the second embodiment is same as the first embodiment.

With this arrangement, unless the flow rate control switch 3 is operated, logical value "H" is applied to the input terminals 11b and 13b of the NOR-gates 11 and 13 so that, if the outlet vent selection switch 2 and the AC switch 4 are operated under this condition, their output signals are not transmitted to the pulse shaping circuit 9 nor the clock terminal of the D flip-flop circuit 8 via the inverter 12.

Therefore, with an outlet vent selection switch 2 having a directly grounded central contact 2b and an AC switch 4 having a directly grounded terminal 4a, they can be urged to operate by means of an L-logical value generating circuit 6 and hence the embodiment comprising such switches equally operates well as intended without any problem. Since the remaining portions of the embodiment are quite similar to those of the first embodiment, they will not be described here any further.

Advantages of the Invention

As described above, since a car air conditioner according to the present invention is provided with a control circuit wherein the defroster contact of the outlet vent selection switch is connected to a pulse shaping circuit that generates a pulse when the defroster contact is selected and the pulse shaping circuit is connected to the reset terminal of a D flip-flop circuit while the inverted output terminal of said D flip-flop circuit is connected to the AC switch by way of a NOR-gate 10 that calculates the logical sum of the logical value "L" generated when the compressor contact of the flow rate control switch is closed. With such an arrangement, the compressor is automatically driven to operate once the flow rate control switch is turned on and the compressor contact is selected in the outlet vent selection switch so that a satisfactory defrosting effect can be ensured under any weather condition where the mist on the window pane cannot be wiped out by simply blowing wet air onto it.

Additionally, since the AC switch is urged to drive the clock terminal of the D flip-flop circuit by applying logical value "L" generated when the compressor contact of the flow rate control switch is closed, the compressor can be driven and stopped simply by means of the AC switch under any condition to enhance the operability of the car air conditioner.

What is claimed is:

1. A car air conditioner comprising;

a D flip-flop circuit having a reset terminal, a clock terminal and an inverted output terminal, an outlet vent selection switch having a defroster contact, a flow rate control switch having a compressor contact for generating an L-logical value when closed, and a push-on type AC switch, characterized in that said AC switch is urged by the L-logical value generated when said compressor contact of said flow rate control switch is closed and at the same time connected to the clock terminal of said D flip-flop circuit by way of a rise shaping circuit, that the defroster contact of said outlet vent selection switch is connected to said reset terminal of said D flip-flop circuit by way of a pulse shaping circuit for generating a pulse when said defroster contact is selected and that the inverted output terminal of said D flip-flop circuit is connected to an AC relay by way of a NOR-gate for calculating the logical sum of the L-logical values generated when said compressor contact is closed.

* * * * *